United States Patent
Li et al.

(10) Patent No.: US 7,562,236 B2
(45) Date of Patent: Jul. 14, 2009

(54) POWER SAVING APPARATUS AND METHOD

(75) Inventors: Jun Li, Guangdong (CN); Kuan-Hong Hsieh, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 483 days.

(21) Appl. No.: 11/308,748

(22) Filed: Apr. 28, 2006

(65) Prior Publication Data

US 2006/0271800 A1   Nov. 30, 2006

(30) Foreign Application Priority Data

May 28, 2005   (CN) .................. 2005 1 0034960

(51) Int. Cl.
*G06F 1/00*   (2006.01)
*G06F 1/32*   (2006.01)
(52) U.S. Cl. .................... 713/300; 713/320
(58) Field of Classification Search ............... 713/300, 713/320
See application file for complete search history.

(56) References Cited

U.S. PATENT DOCUMENTS

| 5,616,988 | A | 4/1997 | Kim |
| 5,721,934 | A * | 2/1998 | Scheurich .................. 713/320 |
| 6,275,221 | B1 | 8/2001 | Song |
| 7,000,127 | B2 | 2/2006 | D'Alessio |
| 7,376,847 | B2 * | 5/2008 | Chen et al. .................. 713/300 |
| 2005/0262367 | A1 | 11/2005 | Shih |
| 2006/0069937 | A1 | 3/2006 | Peng |

FOREIGN PATENT DOCUMENTS

| TW | 545802 | 8/2003 |
| TW | 200504499 | 2/2005 |
| TW | M263556 | 5/2005 |

* cited by examiner

*Primary Examiner*—Mark Connolly
(74) *Attorney, Agent, or Firm*—Winston Hsu

(57) ABSTRACT

A power saving apparatus (20) is interposed between a power supply unit (10) and an electronic device (30). The power saving apparatus includes a switching component (210), a controlling circuit (230) controllable by the electronic device, and a switching circuit (220) controllable by the controlling circuit and the switching component. The controlling circuit receives an "idle" signal from the electronic device and controls the switching circuit to cut off the power supply to the electronic device according to the "idle" signal. The switching component produces an "awakening" signal to control the switching circuit to resume the power supply to the electronic device. A related power saving method is also introduced.

10 Claims, 4 Drawing Sheets

POWER SAVING APPARATUS AND METHOD

FIELD OF THE INVENTION

The present invention relates to power saving apparatus and method, and particularly to a power saving apparatus and method which can properly cut off and resume power supply to an electronic device.

DESCRIPTION OF RELATED ART

According to traditional power saving apparatuses and methods, even in conditions when an electronic device is in a so-called "deep sleep" state, a little power supply is still maintained. Such power supply is applied to certain parts of the electronic device, such as a CPU of the electronic device, in order to rapidly "awaken" the electronic device when reusing the electronic device.

Therefore, according to the traditional power saving apparatuses and methods, power consumption actually continues even when the electronic device is in a "deep sleep" state. Power consumption is still a serious problem to users of the electronic device.

Therefore, there is a need for a power saving apparatus and method which can efficiently solve the power consumption of the electronic device.

SUMMARY OF INVENTION

A power saving apparatus is provided in accordance with a preferred embodiment. The power saving apparatus is interposed between a power supply unit and an electronic device, and includes: a controlling circuit controllable by the electronic device by using an "idle" signal, the "idle" signal indicating that the electronic device is idle for over a predetermined period; a switching component for producing an "awakening" signal; and a switching circuit controllable by the controlling circuit and the switching component to cut off or resume power supply to the electronic device respectively in accordance with the "idle" signal, and the "awakening" signal.

A power saving method is also provided. The method applies a power saving apparatus interposed between a power supply unit and an electronic device and includes a controlling circuit, a switching circuit, and a switching component. The method includes the step of: a) producing an "idle" signal to the controlling circuit if an electronic device remains in an "idle" state over a predetermined period; b) controlling the switching circuit to cut off the power supply to the electronic device in accordance with the "idle" signal at the controlling circuit; c) acting on the switching component to produce an "awakening" signal; and d) controlling the switching circuit to resume the power supply to the electronic device in accordance with the "awakening" signal.

Other advantages and novel features will be drawn from the following detailed description with reference to the attached drawings, in which:

DETAILED DESCRIPTION

Figure 1:
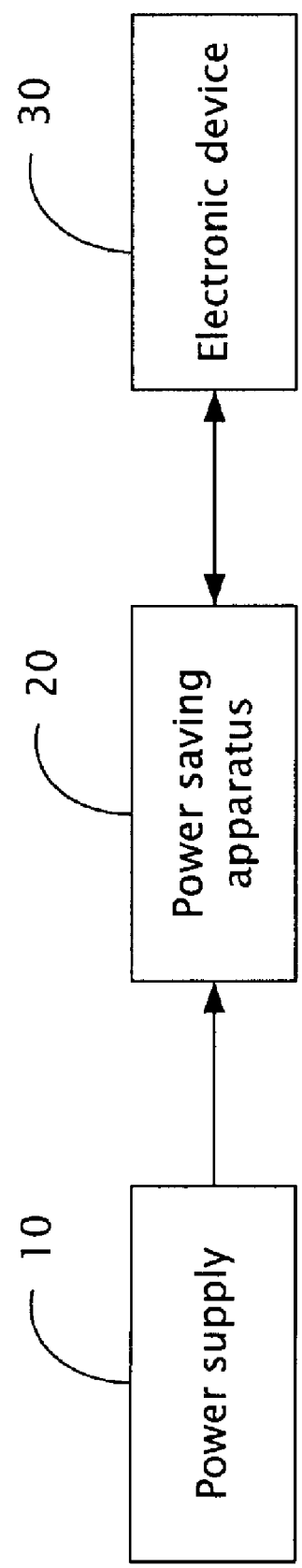
FIG. 1 shows a power saving apparatus connected with a power supply and an electronic device in accordance with a preferred embodiment of the present invention.

Referring to FIG. 1, the power saving apparatus 20 is interposed between a power supply unit 10 and an electronic device 30, and serves as an intelligent power switch for the electronic device 30. The electronic device 30 receives and processes signals (i.e., data and commands) from an external source (not shown) other than the electronic device 30. In general, the electronic device 30 is considered to be in a "busy" state when processing signals; conversely, the electronic device 30 is considered to be in an "idle" state when not processing signals. The electronic device 30 is further capable of outputting real time signals informing the power saving apparatus 20 of its current state so as to control the power supply thereto. In the preferred embodiment, the real time signals typically include a "normal" signal and an "idle" signal. The "normal" signal indicates that the electronic device 30 is in a "busy" state or in an "idle" state under a predetermined time period, and the "idle" signal indicates that the electronic device 30 remains in an "idle" state over the predetermined time period. The power saving apparatus 20 cuts off the power supply to the electronic device 30 pursuant to the "idle" signal. The electronic device 30 is then in a "power off" state, thereby avoiding power consumption thereof. When the electronic device 30 is in the "power off" state, the power saving apparatus 20 is ready to produce an "awakening" signal upon actions of a user. The "awakening" signal indicates that new signals are ready to be inputted into the electronic device 30. The power saving apparatus 20 thereupon resumes the power supply of the electronic device 30 and activates the electronic device 30.

Figure 2:
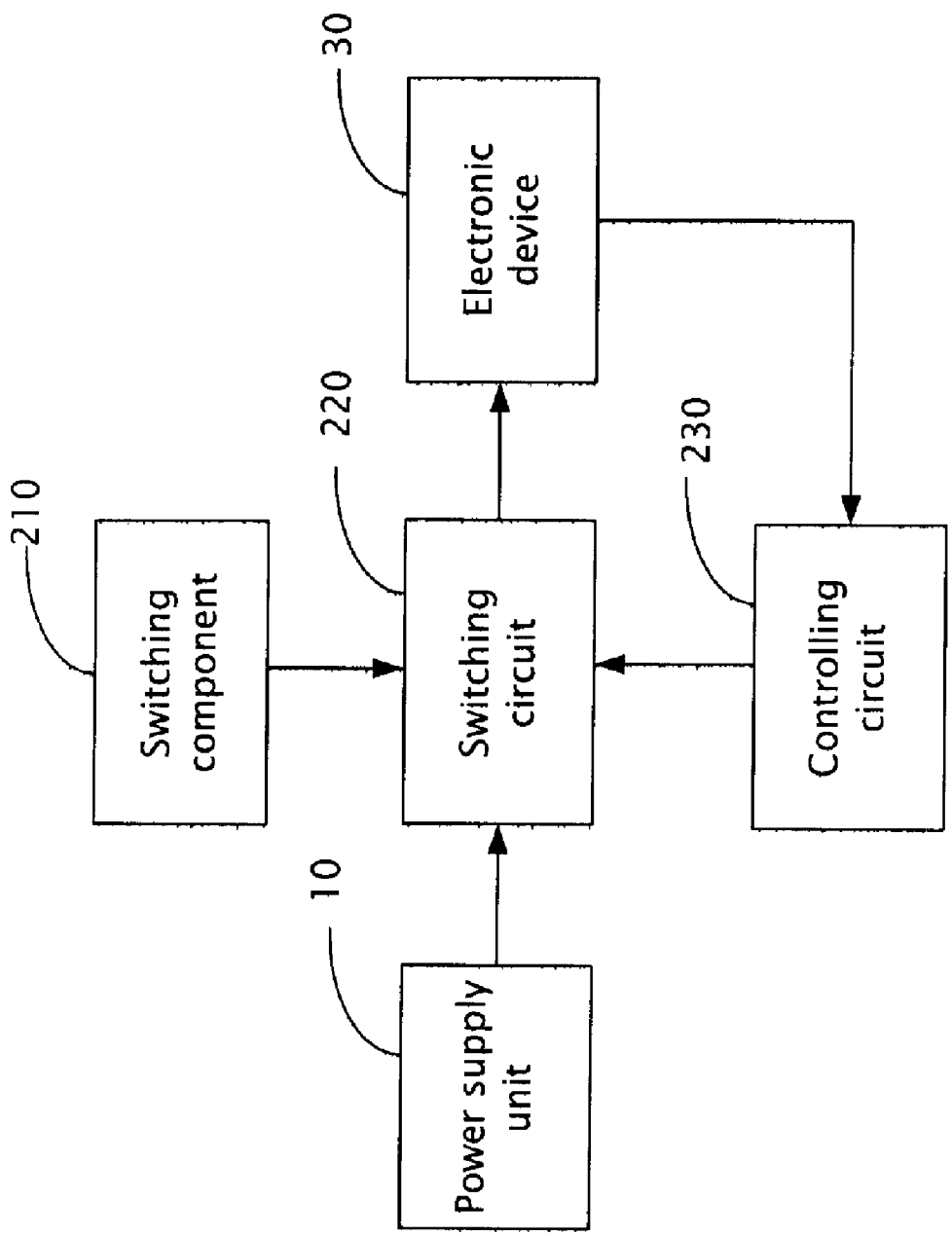
FIG. 2 shows an exemplary block diagram of the power saving apparatus of FIG. 1, together with the power supply and the electronic device.
Figure 3:
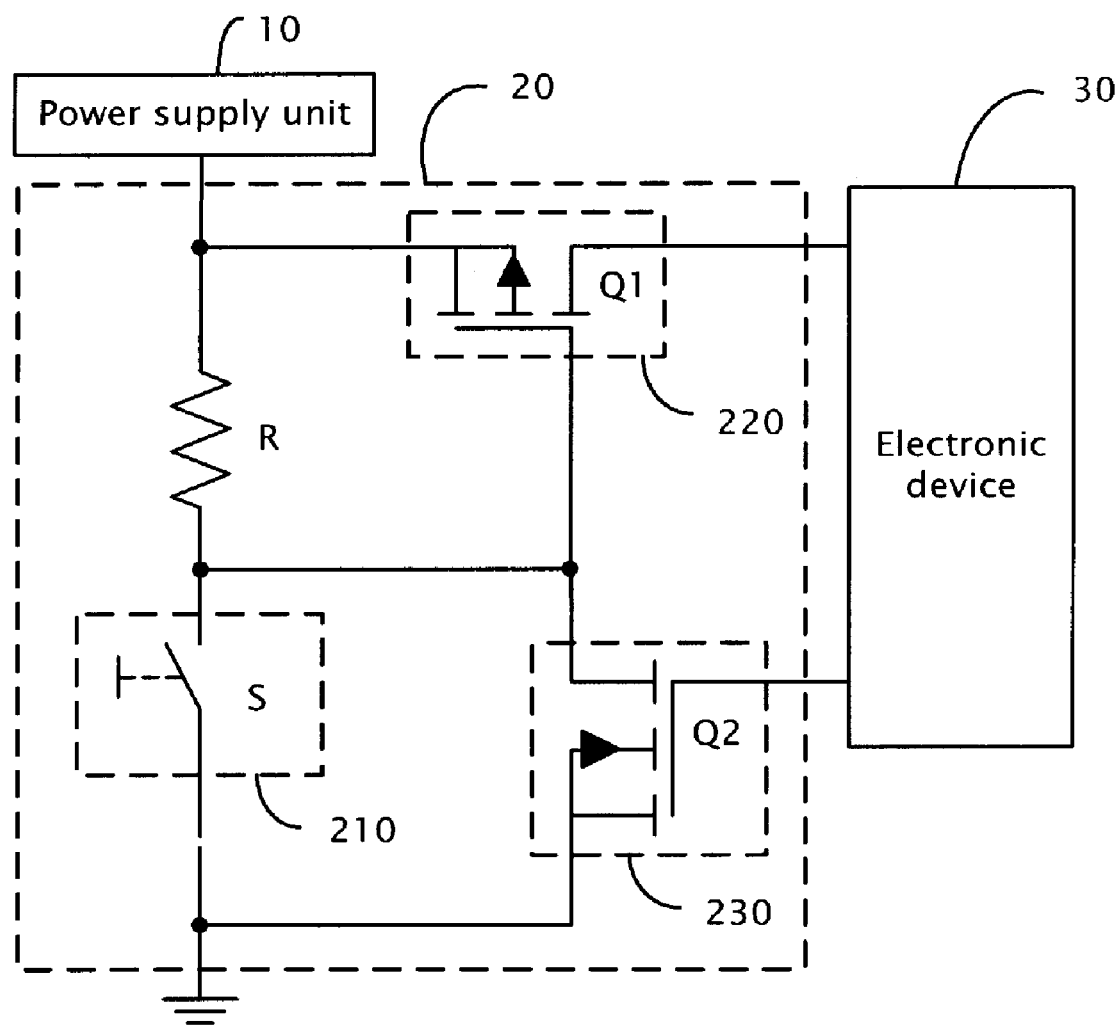
FIG. 3 shows a circuit diagram of the power saving apparatus of FIG. 2, together with the power supply and the electronic device.

Referring to FIG. 2, in one embodiment, the power saving apparatus 20 generally includes a switching component 210, a switching circuit 220, and a controlling circuit 230. The switching circuit 220 is interposed between the power supply unit 10 and the electronic device 30, and is controllable by the switching component 210 and the controlling circuit 230. The controlling circuit 230 is controllable by the electronic device 30 by using the "idle" signal and the "normal" signal. The controlling unit 230 controls the switching circuit to turn off upon receiving the "idle" signal and to be on upon receiving the "normal" signal. The switching component 210 can be controllable to generate an "awakening" signal through a user's direct or indirect acting thereon. For example, as is shown in FIG. 3 and described below, the "awakening" signal is generated as the user invokes the switching component 210. The switching component 210 then transmits the "awakening" signal to control the switching circuit 220 to turn on and resume the power supply to the electronic device 30.

Referring to FIG. 3, in this figure, the switching component 210 is a press button S, the switching circuit 220 is in a controllable three-terminal form, and an example is given as a P-channel Metal Oxide Semiconductor (MOS) (hereinafter, referred to simply as PMOS) Q1, and the controlling circuit 230 is also a controllable three-terminal switching circuit, and an example is given as an N-channel MOS (hereinafter, referred to simply as NMOS) Q2. The PMOS Q1 has a gate, a source and, a drain, each respectively connecting with the NMOS Q2, the electronic device 30 and the power supply unit 10. The NMOS Q2 also has a gate, a source and a drain, each respectively connecting with the electronic device 30, the gate of the PMOS Q1, and a ground potential. The press button S has two terminals, of which one is connected to the source of NMOS Q2 and to the power supply unit 10 via a resistor R, and the other is connected to the drain of NMOS Q2.

Because the press button S and the NMOS Q2 are connected in parallel and interposed between the gate of PMOS Q1 and the ground potential, PMOS Q1 conducts tog carry power to the electronic device 30 when either of the press button S and NMOS Q2 is closed, and cuts off the power supply to the electronic device 30 when both the press button S and NMOS Q2 are open. Therefore, when the electronic device 30 is in a "busy" state or in an "idle" state duration not over the predetermined time period, the electronic device 30 produces a "normal" signal. The "normal" signal maintains the gate of NMOS Q2 at a high-level potential and NMOS Q2 is accordingly conducted (closed). When the electronic device 30 is in the "idle" state over the predetermined time period, the electronic device 30 produces an "idle" signal. The "idle" signal shifts the gate of NMOS Q2 from a high-level potential to a low-level potential, and NMOS Q2 is accordingly cut off (open circuit). When the electronic device 30 has entered the "power off" state in accordance with the "idle" signal, the user can press the press button S to close the circuit. The power supply to the electronic device 30 is therefore recovered and the electronic device 30 is activated.

Figure 4:
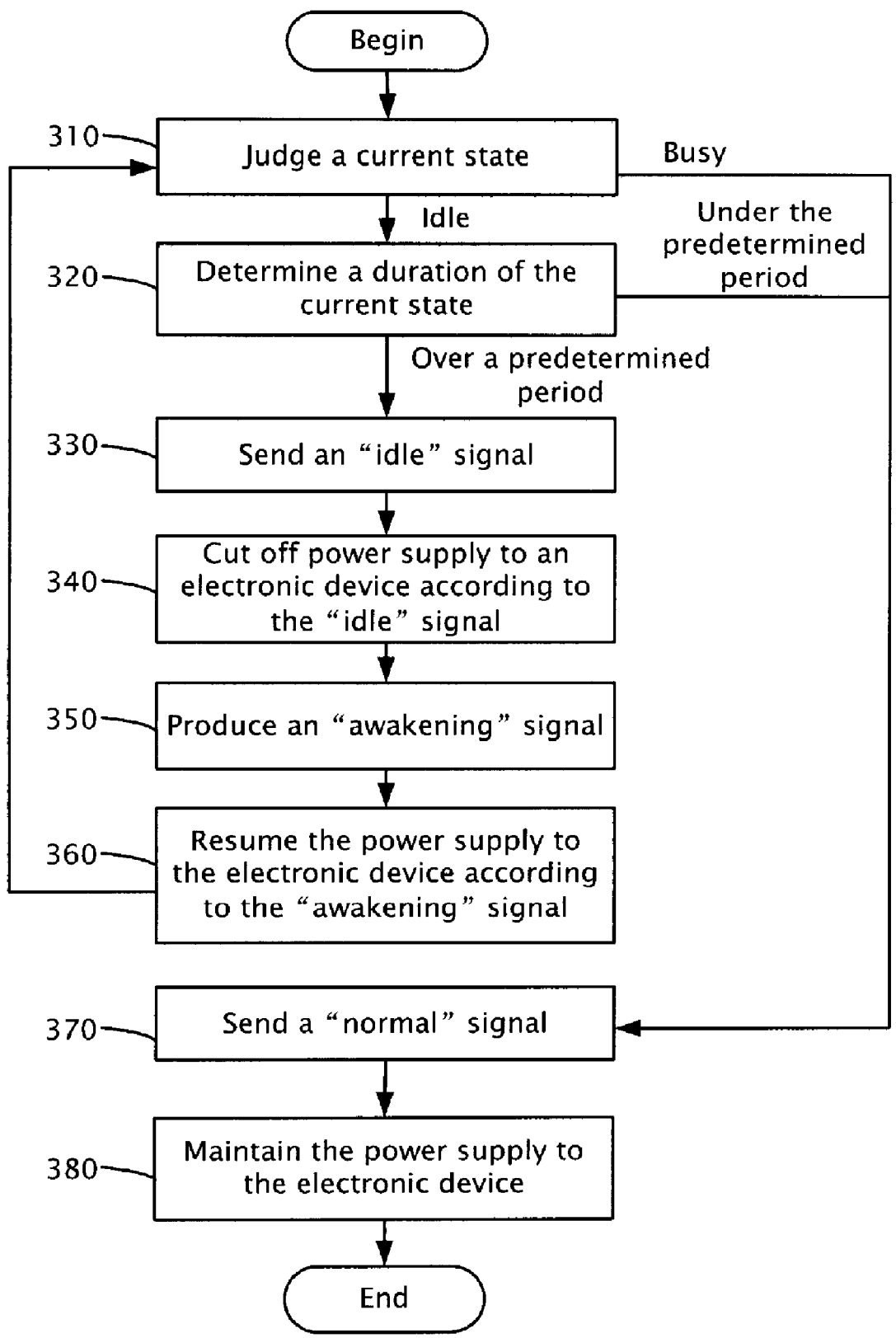
FIG. 4 shows a flowchart of a power saving method in accordance with another preferred embodiment of the present invention.

Referring to FIG. 4, in one embodiment of the power saving method, the electronic device 30 first judges a current state thereof (step S310), and further determines a duration of the current state when the current state is an "idle" state (hereinafter the current "idle" state) (step S320). The electronic device 30 sends an "idle" signal to the controlling circuit 230 if the duration of the current "idle" state is over a predetermined time period (step S330). The controlling circuit 230 controls the switching circuit 220 to turn off in accordance with the "idle" signal. The power supply to the electronic device 30 is then cut off, and the electronic device 30 enters the "power off" state (step S340). The electronic device 30 remains in the "power off" state until a user intends to input new commands and/or data to it. The user acts on the switching component 210 to produce an "awakening" signal (step S350). The "awakening" signal is sent to the switching circuit 220 to control the switching circuit 220 to switch on, and the power supply to the electronic device 30 is thus recovered (step S360). The procedure then returns to step S310 to continue judging the current state.

In the above procedure, if in step S310 the electronic device 30 judges that the current state is a "busy" state or in step S320 the electronic device 30 determines that the duration of the current "idle" state is under a predetermined time period, the electronic device 30 sends a "normal" signal to the controlling circuit 230 (step S370). The controlling circuit controls the switching circuit 220 to be on in accordance with the "normal" signal, and the power supply to the electronic device 30 is thus maintained (step S380).

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A power saving apparatus being interposed between a power supply unit and an electronic device, the power saving apparatus comprising:
    a controlling circuit, wherein the controlling circuit comprises a controllable three-terminal N-channel MOS switching circuit having a gate controllable by the electronic device by using an "idle" signal, the "idle" signal indicating the electronic device is idle over a time period;
    a switching component configured for producing an "awakening" signal; and
    a second switching circuit under control of the controlling circuit and the switching component, and configured for cutting off or resuming power supply to the electronic device respectively in accordance with the "idle" signal and the "awakening" signal.

2. The power saving apparatus according to claim 1, wherein the controlling circuit is further controlled by the electronic device by using a "normal" signal, the "normal" signal indicating that the electronic device is busy in processing signals or is idle under the time period.

3. The power saving apparatus according to claim 2, wherein the second switching circuit is on to maintain the power supply to the electronic device in accordance with the "normal" signal.

4. The power saving apparatus according to claim 1, wherein the second switching circuit is in a controllable three-terminal form, of which one terminal is controlled by the controlling circuit and the switching component.

5. The power saving apparatus according to claim 4, wherein the second switching circuit is a P-channel MOS switching circuit having a gate controlled by the controllable three-terminal N-channel MOS switching circuit and the switching component.

6. A power saving method applying a power saving apparatus interposed between a power supply unit and an electronic device, the power saving apparatus comprising a first switching circuit, a switching component, and a controlling circuit comprising a controllable three-terminal N-channel MOS switching circuit having a gate controlled by the electronic device, the power saving method comprising:
    producing an "idle" signal to the controlling circuit if the electronic device remains in an "idle" state for over a time period;
    controlling the first switching circuit to cut off the power supply to the electronic device in accordance with the "idle" signal at the gate of the controllable three-terminal N-channel MOS switching circuit;
    acting on the switching component to produce an "awakening" signal; and
    controlling the first switching circuit to recover the power supply to the electronic device in accordance with the "awakening" signal.

7. The power saving method according to claim 6, further comprising the step of producing a "normal" signal to the controlling circuit if the electronic device is in a busy state or in the "idle" state under the time period.

8. The power saving method according to claim 7, further comprising the step of controlling the first switching circuit to be on to maintain the power supply to the electronic device in accordance with the "normal" signal at the controlling unit.

9. The power saving method according to claim 6, wherein the first switching circuit is in a controllable three-terminal form, of which one terminal is controlled by the controlling circuit.

10. The power saving method according to claim 9, wherein the first switching circuit is a P-channel MOS switching circuit having a gate controlled by the controllable three-terminal N-channel MOS switching circuit.

* * * * *